United States Patent
Miyake et al.

(10) Patent No.: US 6,587,435 B1
(45) Date of Patent: *Jul. 1, 2003

(54) APPARATUS FOR HIGH SPEED COMMUNICATION ON ASYMMETRIC LINE

(75) Inventors: Yutaka Miyake, Urawa (JP); Teruyuki Hasegawa, Omiya (JP); Toru Hasegawa, Shiki (JP); Toshihiko Kato, Asaka (JP)

(73) Assignee: KDD Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/263,792

(22) Filed: Mar. 5, 1999

(30) Foreign Application Priority Data

Mar. 5, 1998 (JP) .......................................... 10-053676

(51) Int. Cl.⁷ .......................... H04L 12/56; H04L 12/66

(52) U.S. Cl. ........................ 370/236; 370/389; 370/466

(58) Field of Search ................................ 370/229, 230, 370/235, 236, 252, 316, 352, 355, 389, 392, 412, 463, 466, 468, 473, 477

(56) References Cited

U.S. PATENT DOCUMENTS

| | | | | |
|---|---|---|---|---|
| 5,519,699 A | * | 5/1996 | Ohsawa | 370/224 |
| 5,912,903 A | * | 6/1999 | Nakayashiki et al. | 370/217 |
| 6,034,962 A | * | 3/2000 | Ohno et al. | 370/399 |
| 6,038,216 A | * | 3/2000 | Packer | 370/231 |
| 6,128,305 A | * | 10/2000 | Hjalmtysson et al. | 370/410 |
| 6,338,131 B1 | * | 1/2002 | Dillon | 712/201 |
| 6,438,101 B1 | * | 8/2002 | Kalampoukas et al. | 370/229 |

FOREIGN PATENT DOCUMENTS

| | | |
|---|---|---|
| JP | 7-177177 | 7/1995 |
| JP | 9-510596 | 10/1997 |
| JP | 11-205384 | 7/1999 |

OTHER PUBLICATIONS

XVI World Telecom Congress Proceedings (7 pages).
Implementation of TCP Gateway for LAN Interconnection through Wide Area ATM Network, Teruyuki Hasegawa, et al., KDD R&D Laboratories, The Institute of Electronics, Information and Communication Engineers, Technical Report of IEICE, SSE95–81, IN95–52, CS95–101 (Sep. 1995), pp. 67–72.

(List continued on next page.)

*Primary Examiner*—Hassan Kizou
*Assistant Examiner*—Ahmed Elallam
(74) *Attorney, Agent, or Firm*—Birch, Stewart, Kolasch & Birch, LLP

(57) ABSTRACT

The apparatus 10 is set on the line between the first and second computers 1,2 which respectively communicates by a protocol, such as TCP, having a flow control. The delay between the first computer 1 and a position, at which the apparatus 10 is set, is less than the delay between the position and the second computer 2. The apparatus 10 sends and receives a packet to/from the computers 1,2. The apparatus 10 transfers to the second computer 2, a data packet sent from the first computer 1 and being larger than a maximum data amount notified by the second computer 2. The apparatus 10 transfers, to the first computer 1, a data packet sent from the second computer 2, but does not transfer, to the first computer 1, an ACK packet sent from the second computer 2. The apparatus 10 generates, instead of the second computer 2, an ACK packet for a data packet sent from the first computer 1 and then sends the ACK packet to the first computer 1. Therefore, in a case that a large delay section having exists in the line between the computers 1 and 2, it is possible to perform a high speed communication on one way by only setting one apparatus 10.

5 Claims, 8 Drawing Sheets

OTHER PUBLICATIONS

Implementation and Performance Evaluation of TCP Gateway for LAN Interconnection through Wide Area ATM Network, Teruyuki Hasegawa et al., KDD R&D Laboratories, Kamifukuoka–shi, 365 Japan, pp. 262–270 and Abstract.

Corresponding Publication of Japanese JP 9–510596 –PCT/US95/07301.

* cited by examiner

APPARATUS FOR HIGH SPEED COMMUNICATION ON ASYMMETRIC LINE

FIELD OF THE INVENTION

This invention relates to an apparatus which enables to perform a high speed TCP communication on an asymmetric communication line. Namely, it is possible to perform the high speed communication on one way by only setting one apparatus in a case that a large delay section exists in a line among computers.

BACKGROUND

As shown in FIG. 10, regarding the Internet access service via a satellite communication, a communication satellite 3 is used on a route 6 by which data from a computer 1 at a side of the Internet 9 are sent to a computer 2 at a side of each subscriber. It is supposed that a public network 7 such as a telephone and an ISDN is used for a communication from the computer 2 of each subscriber to the computer 1 in the side of the Internet 9. In FIG. 10, 4 denotes a transmitting equipment for the satellite communication, 5 denotes a receiving equipment for the satellite communication and 8 denotes a router.

The system shown in FIG. 10 is employed because it is difficult for each subscriber to have the transmitting equipment 4 for the satellite communication.

On the other hand, a maximum amount of a window-size, which is used for a flow control in the TCP protocol employed by the Internet, is limited. Therefore, a high speed communication is difficult in a network which uses the satellite communication line 6 having a large transmission delay.

Then, it is required to perform a high speed TCP communication from the Internet 9 to the subscriber in such system shown in FIG. 10.

As a prior art for solving the requirement, a technique, which intends to reduce an effect of the transmission delay by setting gateway apparatuses at both ends of a section with a delay in the communication route between the computers 1,2 and by using an original high speed protocol for a communication between gateway apparatuses, is developed.

However, it is not practical to set the gateway apparatus at each side of the subscribers because very many subscribers are supposed.

SUMMARY OF THE INVENTION

An object of the present invention is to provide an apparatus for enabling to perform a high speed TCP communication on an asymmetric communication line without setting a specific equipment at the subscriber's side in a case that a communication through-put reduces based on the transmission delay such as in the Internet access service via a satellite communication.

In a preferred embodiment, the present invention is directed to an apparatus for high speed communication on an asymmetric line, wherein said apparatus being set at a position on a communication line between a first and second computers which respectively communicates by a communication protocol having a flow control and a transmission delay between said position and said first computer being less than a transmission delay between said position and said second computer, said apparatus comprising; means for generating, instead of said second computer, an ACK packet in response to a data packet sent from said first computer, means for sending and receiving a packet to/from said first and second computers, for transferring to said second computer a data packet which is sent from said first computer and of which data amount is larger than an amount which is notified by said second computer as a maximum by which said second computer can be received, for transferring to said first computer a data packet sent from said second computer, and for doing not transfer to said first computer an ACK packet sent from said second computer, wherein a high speed communication from said first computer to said second computer being performed.

In a further preferred embodiment, the present invention is directed to an apparatus, wherein said communication protocol being the TCP protocol.

In a still further preferred embodiment, the present invention is directed to an apparatus further comprising means for obtaining information regarding a connection between said first and second computers from the SYN packet and the SYN+ACK packet, for recording said obtained information, and for deleting said recorded information after disconnecting said connection.

In a more further preferred embodiment, the present invention is directed to an apparatus further comprising means for storing the FIN packet, wherein said stored FIN packet being transferred after a termination of data transfer.

In another preferred embodiment, the present invention is directed to an apparatus further comprising buffer means for storing said data packet sent from said first computer.

In still another preferred embodiment, the present invention is directed to an apparatus further comprising means for performing a re-transmission process by same procedure as said first computer.

In more another preferred embodiment, the present invention is directed to an apparatus, wherein said first computer being connected with the Internet, a satellite communication line being included in a line from said first computer to said second computer, and a transmission delay of a line from said second computer to said first computer less than a transmission delay of said satellite communication line.

The object of the present application will become more readily apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings which are given by way of illustration only and wherein.

DESCRIPTION OF THE PREFERRED EMBODIMENT

As an embodiment of the present invention, an apparatus for performing a high speed TCP communication on an asymmetric communication line, hereinafter called as a high speed apparatus or simply an apparatus, will be explained.

Figure 1:
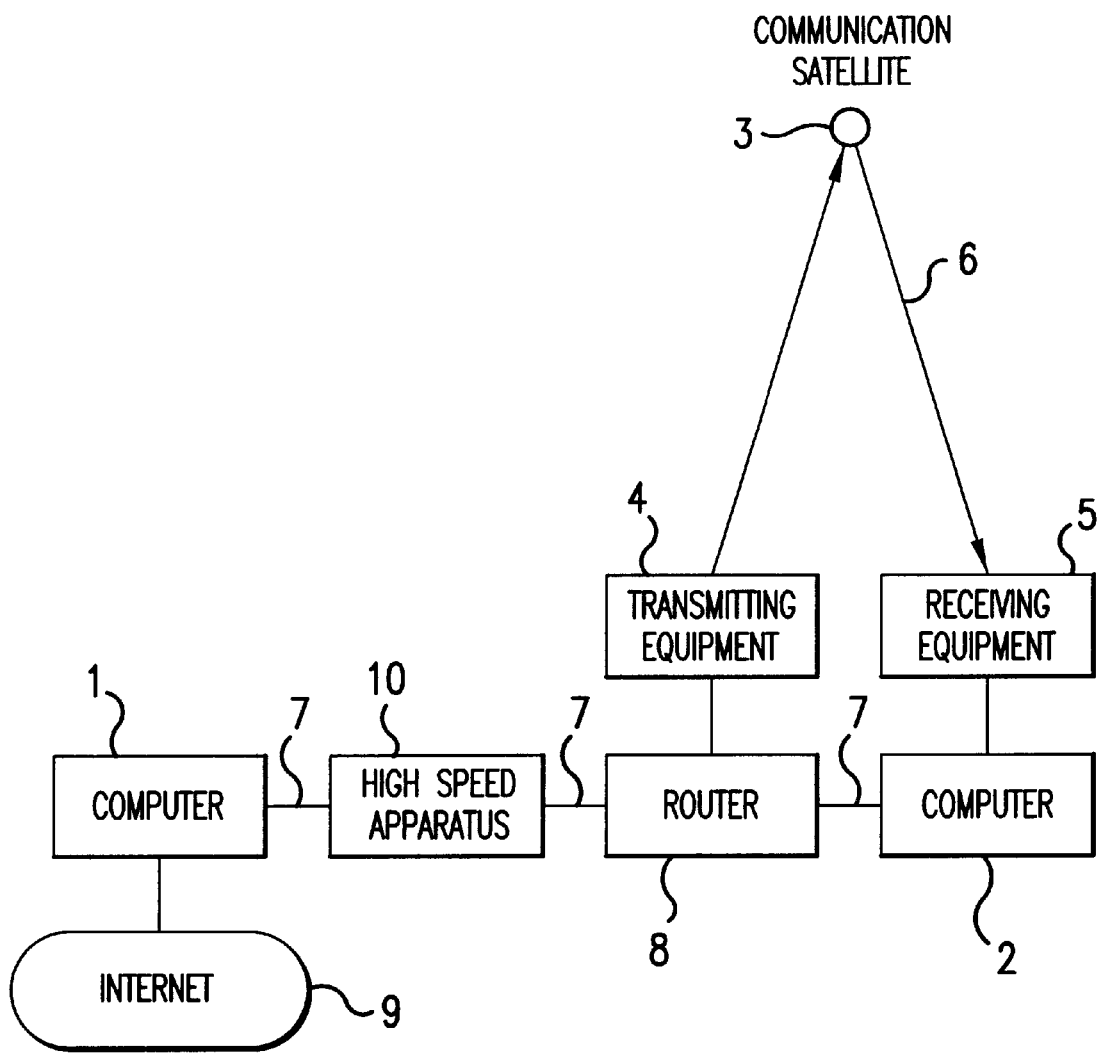
FIG. 1 shows an example to which an apparatus for performing a high speed TCP communication on an asymmetric communication line of the present invention is applied.

As shown in FIG. 1, in this embodiment, the Internet access service is performed by a communication with the TCP protocol having a flow control via a satellite communication line 6 having a large transmission delay and a high speed apparatus 10 is set only at a side of a computer 1, namely at one end of a section having a large transmission delay on a transmission line. The TCP protocol is widely used in the Internet. The TCP protocol prevents an over-flow by its flow control function.

In FIG. 1, 2 denotes a computer at a side of a subscriber, namely at an opposite end of the section having the large transmission delay on the transmission line. Further, 3 denotes a communication satellite, 4 denotes a transmitting equipment for a satellite communication, 5 denotes a receiving equipment for the satellite communication, 7 denotes a public network with a small transmission delay, 8 denotes a router. The computer 1 receives data sent from the Internet, then sends the data to the computer 2 via the satellite communication line 6. The computer 2 sends data to the computer 1 by using the public network 7 such as a telephone and an ISDN.

Figure 2:
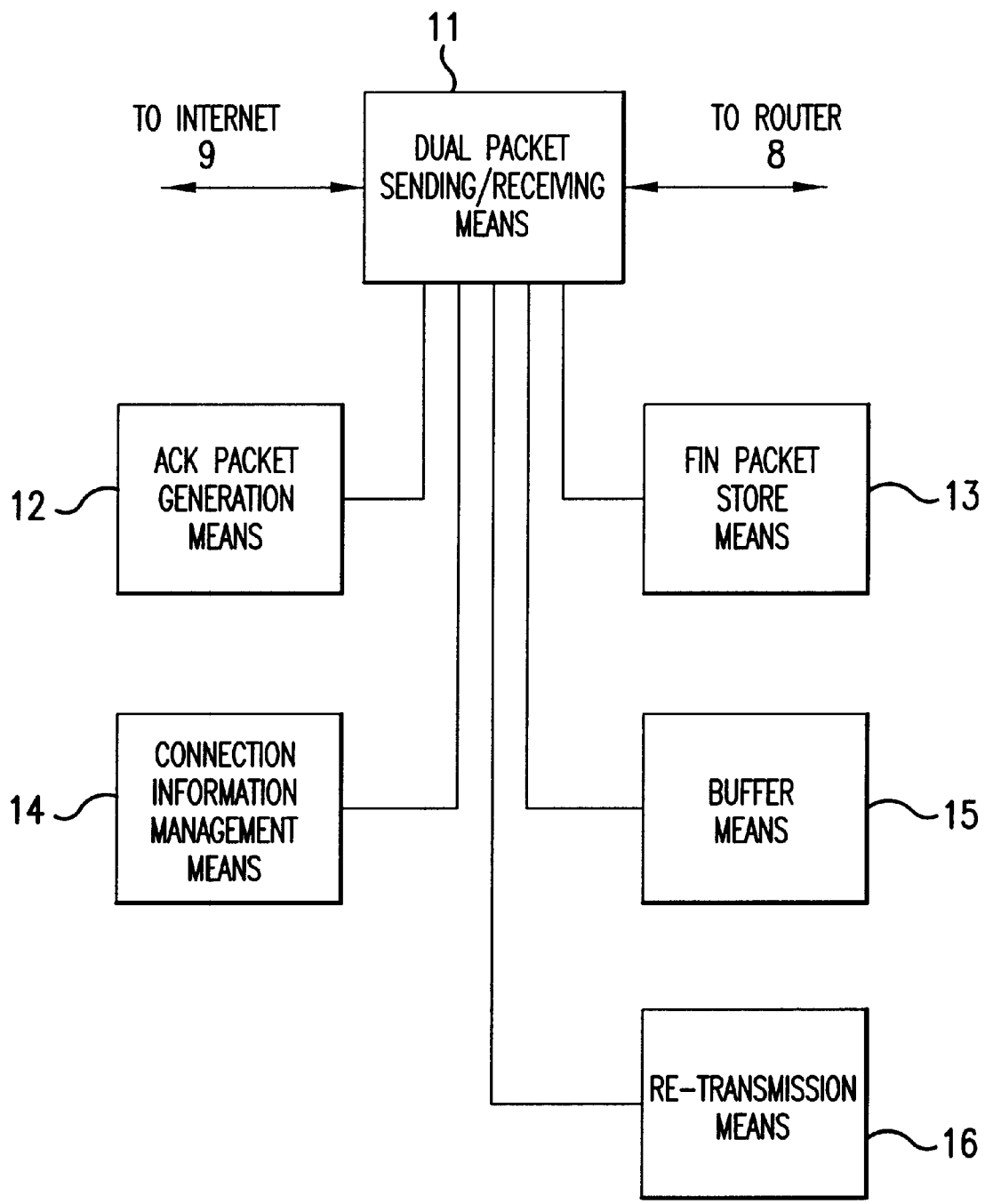
FIG. 2 shows an example of a configuration of an apparatus for performing a high speed TCP communication on an asymmetric communication line.

As shown in FIG. 2, the high speed apparatus 10 comprises means 11 for sending and receiving a packet in both ways or in dual directions, means 12 for generating an ACK packet, means 13 for storing an FIN packet, means 14 for managing a connection information, means 15 for buffering and sending a data packet and means 16 for processing a re-transfer procedure.

The high speed apparatus 10 shown in FIG. 1 basically performs its function and operation as follows.

When a connection between the computers 1 and 2 is established, the apparatus 10 only transfers a received packet by using the both way packet sending and receiving means 11. At this time, in the apparatus 10, the connection information management means 14 gets a connection information from the received packet and brings a information necessary of a management such as a sequence number, the other party in the communication and a port number out of the connection information, then the means 14 manages the connection. By managing the connection information, it is possible to distinguish each connection and to perform a high speed communication at every connection, in a case that many connections are being established because of many subscribers.

When data are transferred between the computers 1 and 2, the sending and receiving means 11 receives the DATA packet sent from the computer 1 at the Internet side and the ACK packet generation means 12 generates an ACK (acknowledgement response) packet in response to the DATA packet. Then the ACK packet generation means 12 sends the ACK packet to the computer 1 via the sending and receiving means 11. By these operations, the computer 1 imagines that the other party in the communication (the computer 2 at the subscriber's side) exists in a position having small transmission delay.

Further, in the apparatus 10, the sending and receiving means 11 transfers the received DATA packet to the computer 2 at the subscriber's side. In transferring the DATA packet to the computer 2, an amount of the DATA packet sent by the sending and receiving means 11 is larger than a window size indicated by an ACK packet sent from the computer 2. In this case, the computer 2 can practically receive the large amount of DATA packet by a renewal of the window size performed in the computer 2 because it is required a long time for the DATA packet to arrive at the computer 2 by the way of the satellite communication line 6 having a large transmission delay, while a receiving buffer in the computer 2 is over-flowed if the computer 2 is adjacent to the apparatus 10, then the transmission delay is small. The ACK packet sent from the computer 2 is not transferred to the computer 1. Namely, the ACK packet sent from the computer 2 is absorbed by the apparatus 10.

Based on the above-mentioned operations, it is possible for the computer 1 at the Internet side to continuously sends a DATA packet.

When the connection between the computers 1 and 2 is released, even if an FIN packet is sent from the computer 1, the apparatus 10 does not transfer the FIN packet until the DATA transmission to the computer 2 is finished. The FIN packet is stored and reserved by the FIN packet storing means 13. When the DATA transmission to the computer 2 has been completed, the FIN packet stored in the means 13 is transferred to the computer 2 by the sending and receiving means 11. By this operation, the connection is released. At this time, the management means 14 deletes the information corresponding to the released connection.

Referring FIGS. 3 to 8, the detailed function and operation of the apparatus 10, on each sequence of connection establishment, data transfer and connection release, will be described.

FIGS. 3 to 8 show sequences in a case that the apparatus 10 is set at a position in the communication line where the computers 1 and 2 communicate by using TCP protocol. A section between the computer 1 and the apparatus 10 is a short-distance section, then its transmission delay is small. A section between the apparatus 10 and the computer 2 is a delay section, then its transmission delay is large because of a long distance etc.

Figure 3:
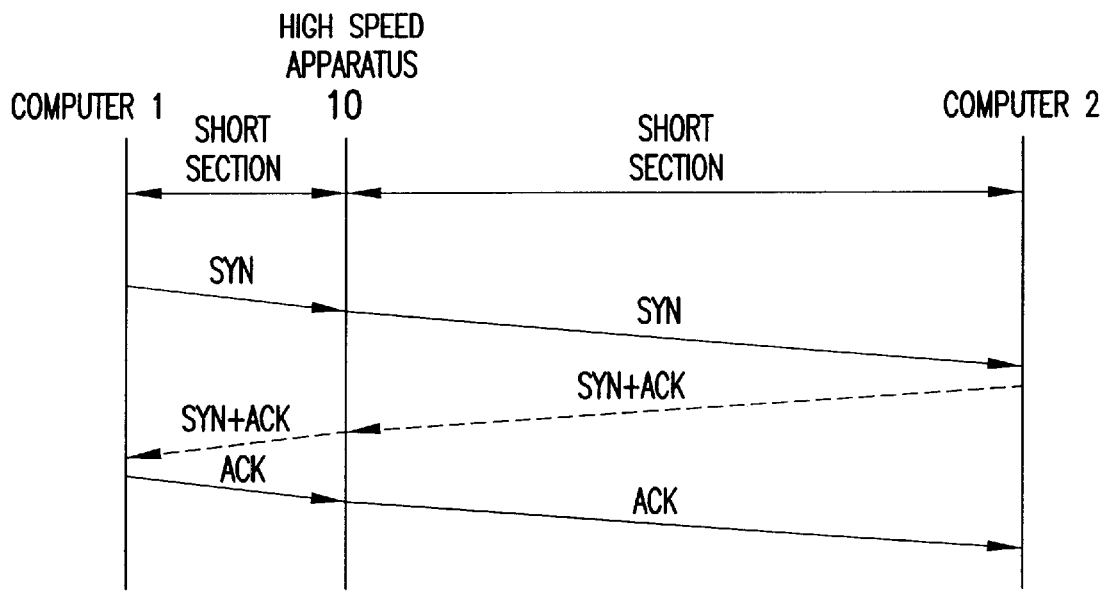
FIG. 3 shows a sequence in a case that a procedure for establishing a connection is started by a computer at a side of a section having a relatively small transmission delay.
Figure 4:
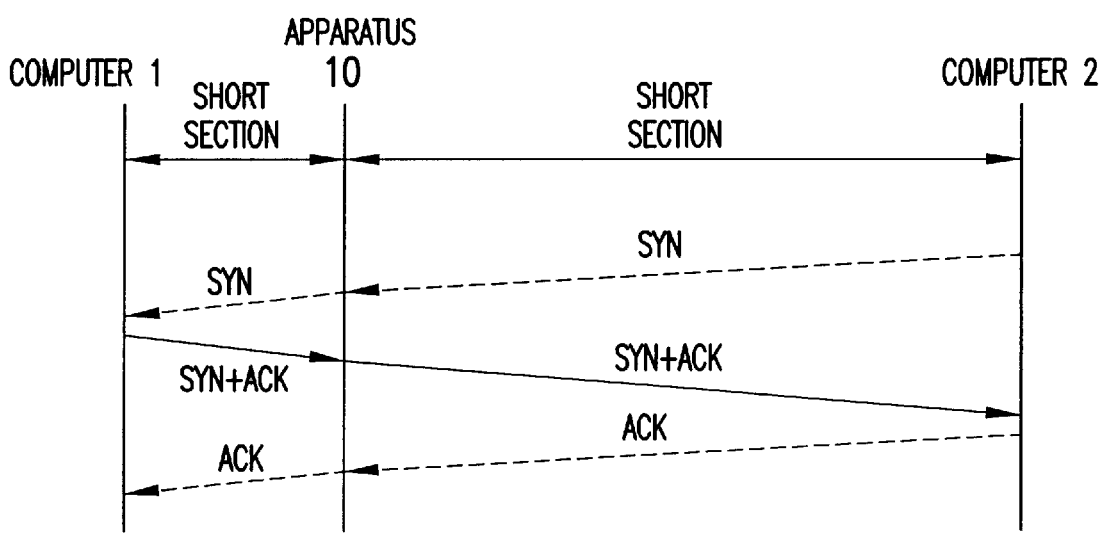
FIG. 4 shows a sequence in a case that a procedure for establishing a connection is started by a computer at a side of a section having a relatively large transmission delay.

FIGS. 3 and 4 show sequences in the establishment of the TCP connection, wherein FIG. 3 shows a sequence in a case that a procedure for establishing a connection is started by the computer 1 at a side of a short-distance section while FIG. 4 shows a sequence in a case that a procedure for establishing a connection is started by the computer 2 at a side of the delay section.

In the TCP protocol, the connection is established by using an SYN flag and an ACK flag of the code field in the header of the packet.

In detail, the connection is established by a handshaking which exchanges an SYN packet, an SYN+ACK packet and an ACK packet. The SYN packet is a packet of which SYN flag is set as "1", the SYN+ACK packet is a packet of which SYN flag and ACK flag are respectively set as "1" and the ACK packet is a packet of which ACK flag is set as "1".

The high speed apparatus 10 transfers a received packet in each sequence, while there are two kinds of sequences dependent on the computer which starts the procedure for establishing the connection, as shown in FIGS. 3 and 4. However, in transferring a packet, the apparatus 10 sets an information on the connection such as a transmission address, a receiving address, a port number of an origin and a port number of a destination respectively inside the packet. Then, the apparatus 10 records, as the connection to be an object of high speed communication, the obtained information by the connection management means 14.

Figure 5:
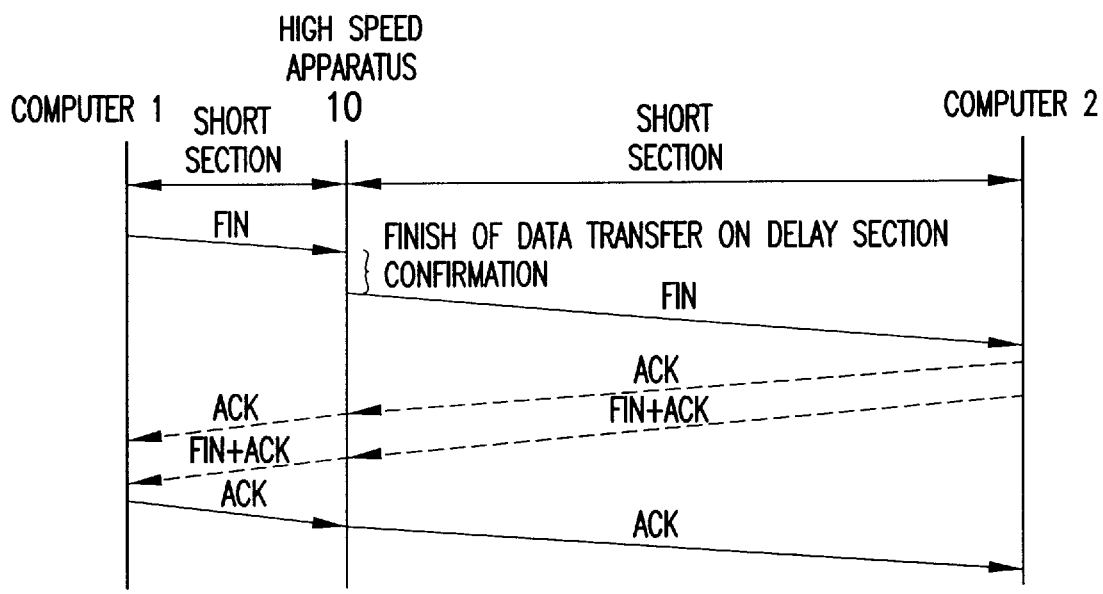
FIG. 5 shows a sequence in a case that a procedure for releasing a connection is started by a computer at a side of a section having a relatively small transmission delay.
Figure 6:
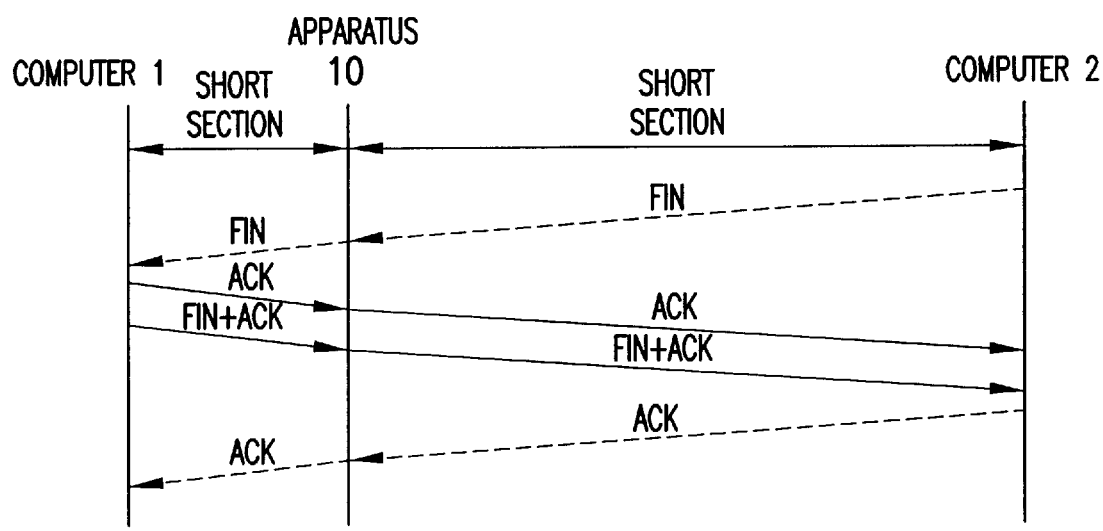
FIG. 6 shows a sequence in a case that a procedure for releasing a connection is started by a computer at a side of a section having a relatively large transmission delay.

FIGS. 5 and 6 show sequences in the release of the TCP connection, wherein FIG. 5 shows a sequence in a case that a procedure for releasing the connection is started by the computer 1 at a side of a short-distance section while FIG. 6 shows a sequence in a case that a procedure for releasing the connection is started by the computer 2 at a side of the delay section.

In the TCP protocol, the connection is released by using an FIN flag and an ACK flag of the code field in the header of the packet. In detail, the connection is released by a handshaking which exchanges an FIN packet, the ACK packet and an FIN+ACK packet. The FIN packet is a packet of which FIN flag is set as "1", the ACK packet is a packet of which ACK flag is set as "1" and the FIN+ACK packet is a packet of which FIN flag and ACK flag are respectively set as "1".

In the same manner of establishment of the connection, there are two kinds of sequences dependent on the computer which starts the procedure for releasing the connection, as shown in FIGS. 5 and 6.

In the sequence that the FIN packet is sent by the computer 1 for starting the release of the connection, as shown in FIG. 5, the apparatus 10 receives the FIN packet and stores temporarily the received FIN packet by the FIN packet storing means 13, then the apparatus 10 waits a finish of the communication between the apparatus 10 and the computers 2. The apparatus 10 transfers the FIN packet held by the means 13 to the computer 2 after confirming the finish of the communication. After the FIN packet was transferred, the apparatus 10 transfers a received packet to the other party.

In the sequence that the FIN packet is sent by the computer 2 for starting the release of the connection, as shown in FIG. 5, the apparatus 10 only transfers any received packet to the other party. Namely, the apparatus 10 operates in-accordance with the generally known release sequence.

Figure 7:
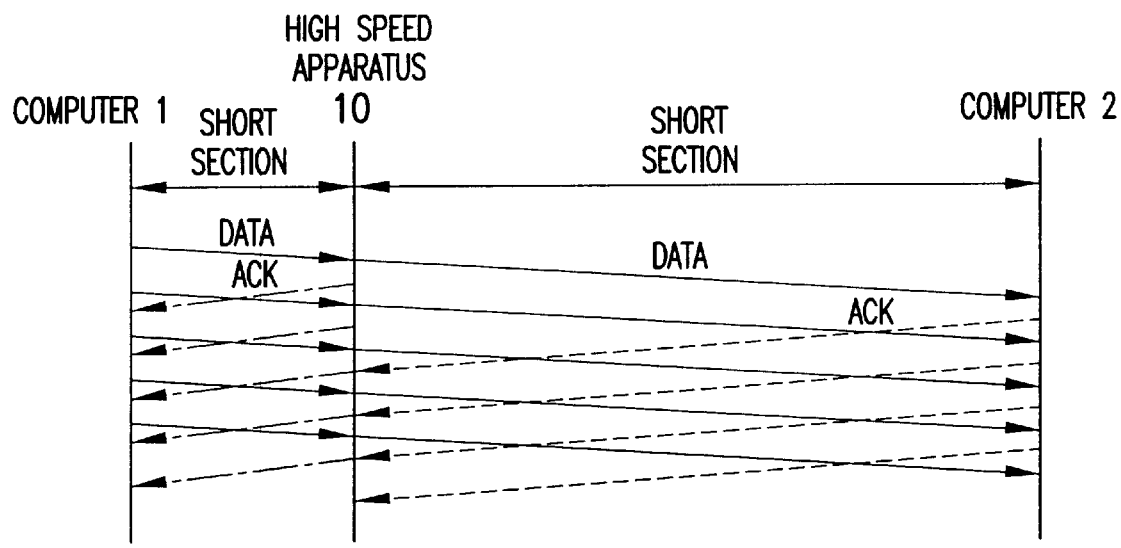
FIG. 7 shows a sequence in a case that data are transferred by a computer at a side of a section having a relatively small transmission delay.
Figure 8:
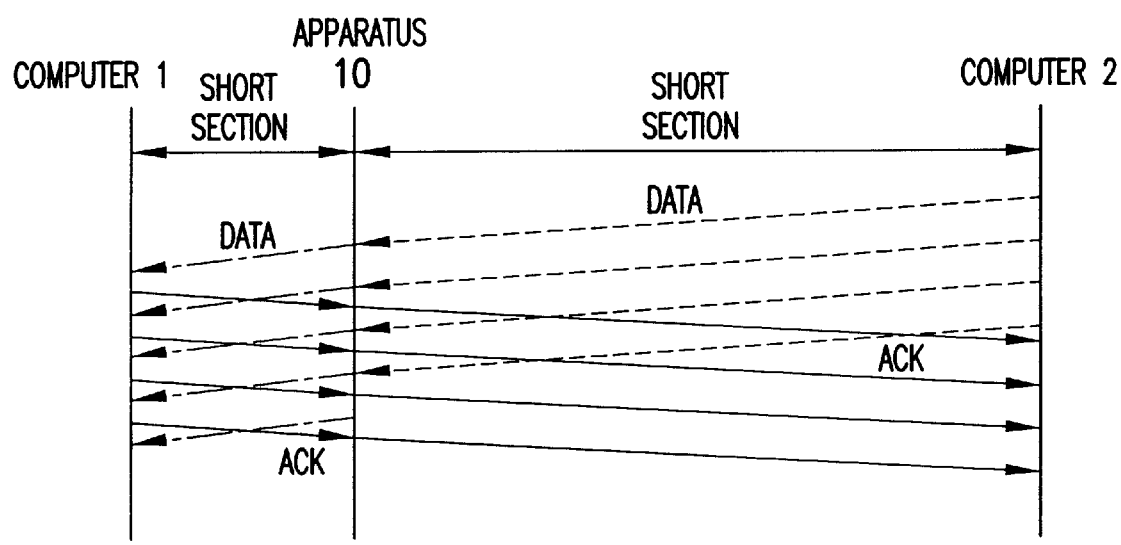
FIG. 8 shows a sequence in a case that data are transferred by a computer at a side of a section having a relatively large transmission delay.

When the connection release procedure is being performed, the apparatus 10 obtains a connection information corresponding to the connection to be released. When a connection has been released, the apparatus 10 deletes a connection information corresponding to the released connection by the function of the connection management means FIGS. 7 and 8 show sequences of data transferring, wherein FIG. 7 shows a sequence in a case that the computer 1 at the side of the short-distance section starts to send a DATA packet, while FIG. 8 shows a sequence in a case that the computer 2 at the side of the delay section starts to send the data packet.

The apparatus 10 transfers the DATA packet, which is sent from the computer 1 to the computer 2, at high speed in accordance with the present invention. However, the apparatus 10 transfers the DATA packet, which is sent from the computer 2 to the computer 1, at normal speed in accordance with the ordinary procedure.

Namely, in the case that the DATA packet is transferred from the computer 2 to the computer 1, the apparatus 10 only transfers the received DATA packet to the computer 2 by the function of the sending and receiving means 11 without special management.

On the other hand, in the case that the DATA packet is transferred from the computer 1 to the computer 2, the apparatus 10 performs following process for high speed data communication.

Namely, in the apparatus 10, when the sending and receiving means 11 receives the DATA packet sent from the computer 1, the ACK packet generation means 12 generates an ACK packet corresponding to the received DATA packet instead of the computer 2 and sends the generated ACK packet to the computer 1 by using the function of the sending and receiving means 11. The ACK packet is generated and sent with same format as that is ordinarily generated and sent by the computer 2.

When the computer 1 receives the ACK packet sent from the apparatus 10, the computer 1 recognizes that the ACK packet was immediately and directly returned from the computer at a position with small transmission delay. Therefore, the computer 1 continuously sends out a next DATA packet to the computer 2.

Further, the apparatus 10 transfers the received DATA packet to the computer 2 by using the sending and receiving means 11.

By these operation, as the DATA packet continuously arrives at the apparatus 10, the DATA packet is continuously received and transferred to the computer 2 by the apparatus 10 in consideration of a receiving status in the computer 2.

By the way, it is fundamentally prohibited by the TCP protocol to send data more than the buffer size which is notified in the window field of the ACK packet sent from the computer 2.

However, it is possible to suppose, because of the large transmission delay, that the previously sent DATA packet has been smoothly received and processed by the computer 2 when the newly sent DATA packet arrives at the computer 2. Then, it is possible for the apparatus 10 to transfer, to the computer 2, the DATA packet more than the window size (maximum amount of available receiving data) notified by the computer 2.

Therefore, without waiting the ACK packet from the computer 2, the DATA packet is continuously sent from the computer 1 to the computer 2 via the apparatus 10. Namely, the communication speed becomes high speed.

When the computer 2 receives the DATA packet, the computer 2 returns an ACK packet corresponding to the DATA packet. On the other hand, the apparatus 10 has already generated and sent the ACK packet instead of the computer 2. Therefore, the apparatus 10 does not transfer the ACK packet sent from the computer 2 to the computer 1, while the apparatus 10 only receives the ACK packet.

After the computer 1 sent the DATA packet to the computer 2, the computer 1 deletes the DATA packet in its transmission buffer based on receiving the ACK packet returned from the apparatus 10 correspondingly to the DATA packet sent from the computer 1.

Therefore, the apparatus 10 keeps the DATA packet, having transferred to the computer 2, in the buffer means 15 until the apparatus 10 receives the ACK packet. returned from the computer 2 correspondingly the transferred DATA packet, so that the apparatus 10 itself re-transmits the DATA packet to the computer 2 when the computer 2 requests the re-transmission of the DATA packet.

When a re-transmission of the DATA packet is required because of a loss of the DATA packet etc., the apparatus 10 imitates the operation of the computer 1, then communicates, between the apparatus 10 and the computer 2, in accordance with the re-transmission procedure of the TCP protocol by using the re-transmission procedure means 16. Namely, the apparatus 10 has a function of the communication protocol used in the computers 1,2 such as an error recovery function in the error occurrence and an amount control of sending data in a congestion of the network.

Figure 9:
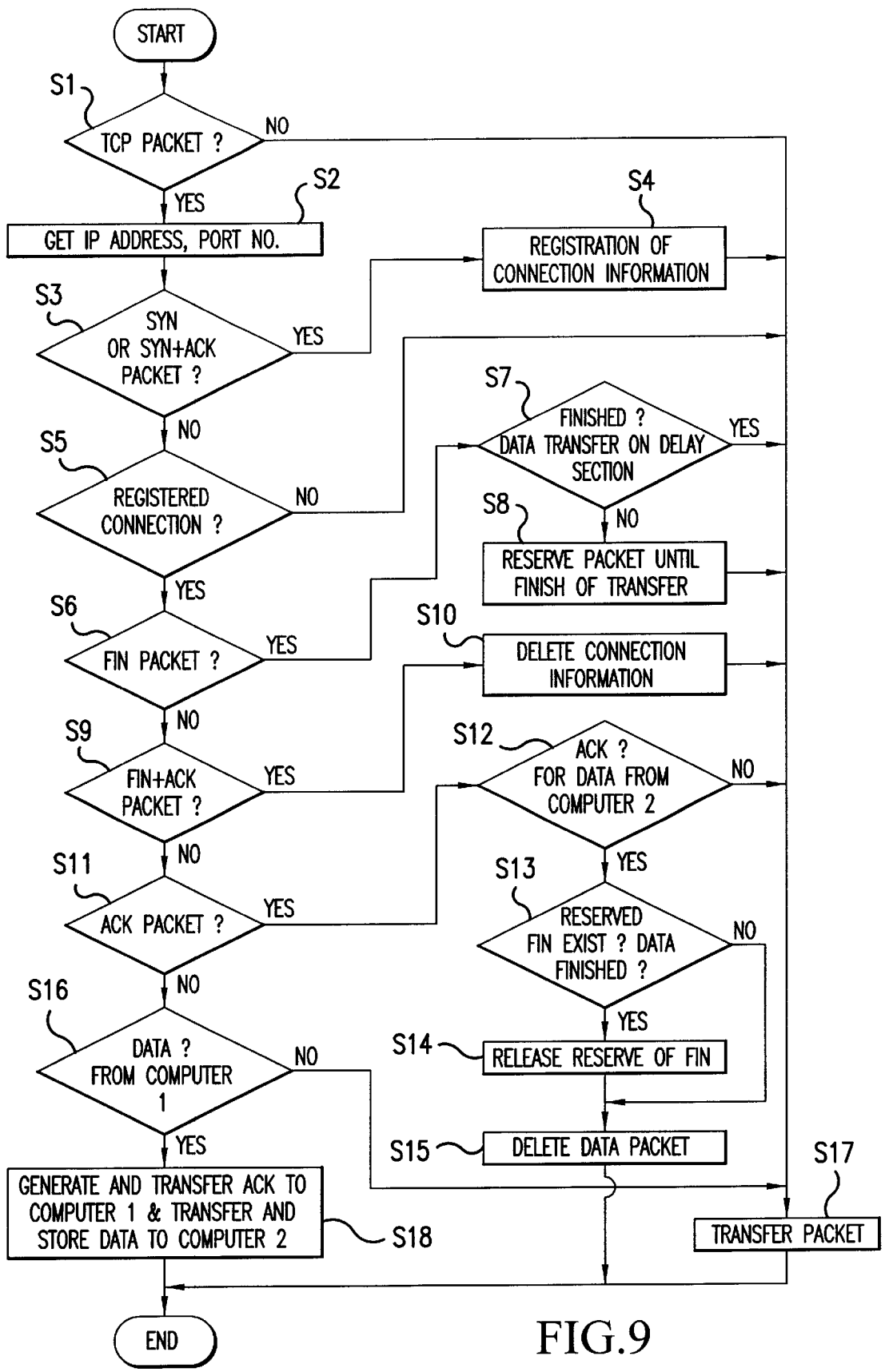
FIG. 9 is a flow-chart showing a procedure of an apparatus for performing a high speed TCP communication on an asymmetric communication line of the present.
Figure 10:
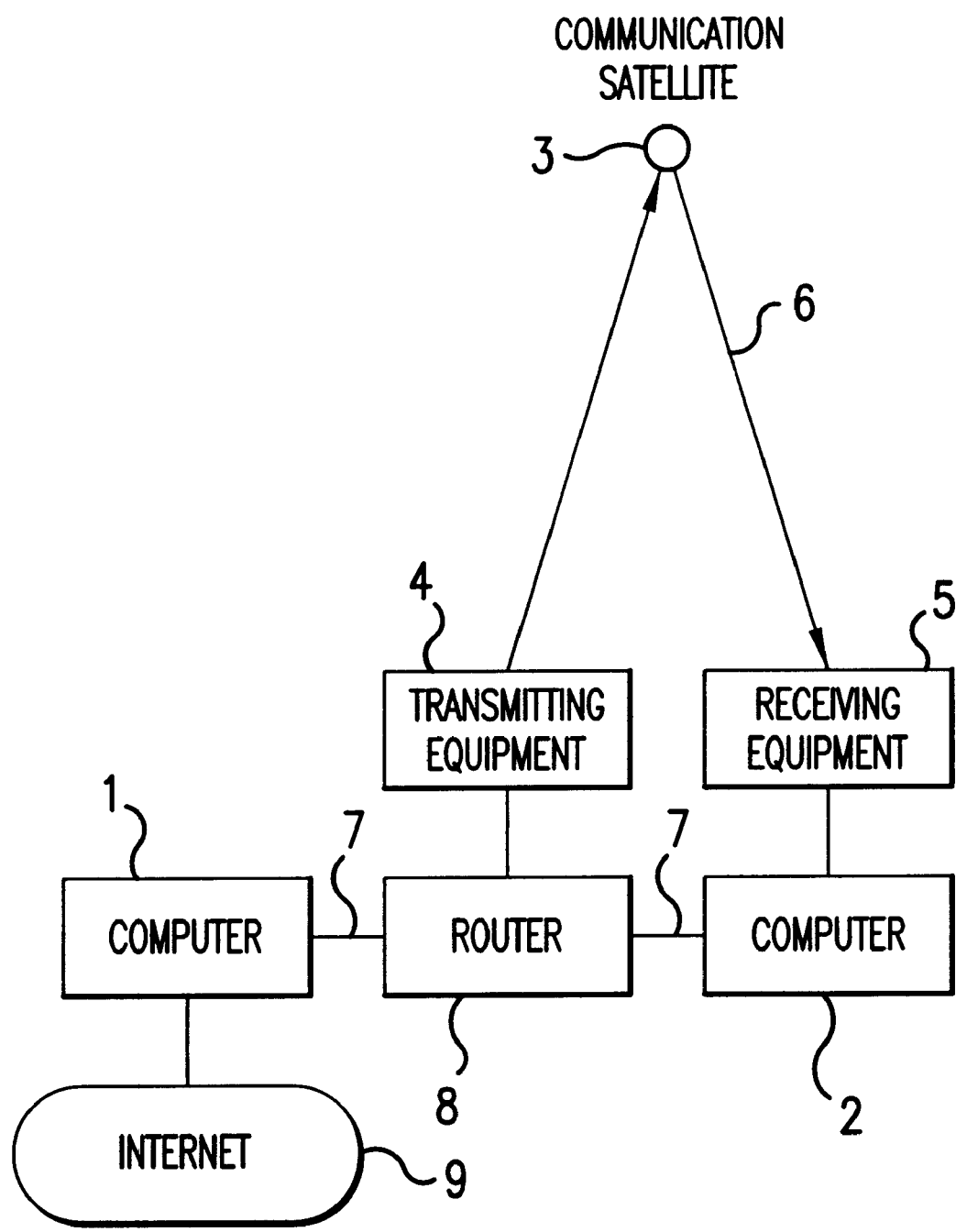
FIG. 10 shows an example a communication between computers via a telecommunication satellite.

Now, referring to the flow-chart shown in FIG. 9, an algorithm, by which the apparatus 10 performs a process in a case of receiving an arbitral one packet, wherein the flow-chart does not include an error correction for a missing packet for simplicity.

When the apparatus 10 receives a packet sent from the computer 1 or the computer 2, the apparatus 10 recognizes whether the packet is a TCP packet based on the TCP protocol or not by confirming a protocol field of the received packet (STEP S1). If the packet is not a TCP packet, the packet is transferred by an intact way (STEP S17).

If the packet is a TCP packet, the apparatus 10 gets its IP address and TCP port number (STEP S2).

The apparatus 10 confirms whether the received TCP packet is a packet of which SYN flag in the code field is set "1" or a packet of which both SYN and ACK flags are set "1" (STEP S3). If the received TCP packet is an SYN packet of which SYN flag is set "1" or an SYN+ACK packet of which SYN and ACK flags are set "1", the start of the communication is recognized, then its connection information is registered and the packet is transferred (STEP S17).

In the case that the received TCP packet is not the SYN packet but also the SYN+ACK packet, it is judged whether the connection information of the TCP packet has been registered. If the connection information was not already registered, it is judged that the connection is not an object of the high speed communication, then the packet is transferred (STEP S17).

In the case that the connection information of the received TCP has been registered, it is judged whether an FIN flag is set and an ACK flag is not set respectively in the code field of the received packet (STEP S6). If the FIN flag is set and the ACK flag is not set, namely the received TCP packet is the FIN packet, it is confirmed whether a communication in the delay section has been finished or not (STEP S7). If the communication has been finished, the apparatus 10 transfers the received FIN packet (STEP S17). If the communication has not been finished, the transfer of the FIN packet is deferred or reserved (STEP S8), then the apparatus 10 transfers the reserved FIN packet after confirming a finish of data transfer in processing a succeeding packet (STEP S17).

Regarding a packet other than the above-mentioned process, it is confirmed whether the FIN flag and the ACK flag are set in its code field at the same time (STEP S9). If the FIN flag and the ACK flag are set at the same time, it is judged that the connection has been released, then the apparatus 10 deletes the corresponding connection information (STEP S10) and transfers the packet (STEP S17).

In STEP S11, the apparatus 10 confirms whether the received packet is a packet of which ACK flag in the code field is set and a packet of which one of SYN and FIN flags is not set (STEP S11). If the ACK flag is set but one of SYN and FIN flags is not set, it is confirmed whether the packet is a packet sent from the computer 2 in the delay section or not (STEP S12). In the case that the packet is not the packet sent from the computer 2, the apparatus 10 transfers the packet (STEP S17). However, if the packet is sent from the computer 2 and the packet is not an ACK packet corresponding to the SYN packet or the FIN packet but it is an ACK packet corresponding to the DATA packet, the FIN packet in the corresponding connection is not transferred and reserved, then the apparatus 10 confirms whether the data transfer is finished or not by monitoring the ACK packet (STEP S13). In the case that all conditions mentioned above are satisfied, the apparatus 10 releases the reservation of the FIN packet (STEP S14), then deletes the DATA packet corresponding to the ACK packet from the buffer means 15 (STEP S13). In the case that any condition mentioned above is not satisfied, the apparatus 10 only deletes the DATA packet corresponding to the ACK packet from the buffer means 15 (STEP S15). In both cases, the received ACK packet is not transferred.

In STEP S16, the apparatus 10 confirms whether the received packet is the DATA packet sent from the computer 1 in the short-distance section. In the case that the DATA packet is not the packet sent from the computer 1, the apparatus 10 transfers the DATA packet by the intact way (STEP S17). If the DATA packet is sent from the computer 1, the apparatus 10 generates an ACK packet for the received DATA packet and sends the ACK packet to the computer 1. At the same time, the apparatus 10 transfers the received DATA packet to the computer 2 in the delay section and also stores the received DATA packet in the buffer means 15 (STEP S17). The DATA packet stored in the means 15 is deleted after receiving an ACK packet sent from the computer 2 corresponding to the transferred DATA packet.

Above-mentioned example is, as shown in FIG. 1, that the high speed apparatus 10 is set at the side of the computer 1 or at one side of delay section in the transmission line, wherein the communication is performed, via the satellite communication line 6, by the TCP protocol having the flow control for the Internet access service.

However, the present invention is not limited by such example, therefore it is possible to apply the present invention to other systems.

Figure 11:
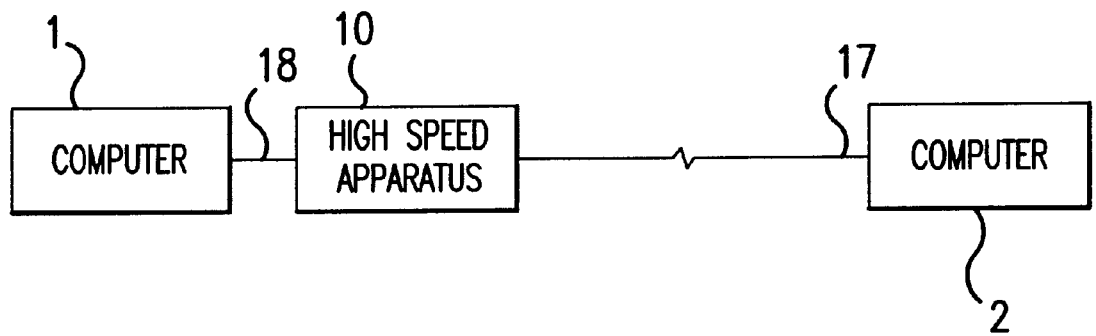
FIG. 11 shows another example to which an apparatus for performing a high speed TCP communication on an asymmetric communication line of the present invention is applied.

For example, as shown in FIG. 11, in a case that the communication is executed, via an arbitrary communication line or network 17 having transmission delay such as an international communication and the satellite communication, by the TCP protocol, the apparatus 10 can be set at one side of delay section in the transmission line. In this case, when the computer 2 at the opposite side of the delay section receives data, the communication speed is improved, namely high speed communication is performed. In FIG. 11, 18 denotes a transmission line having a small delay.

Further, in addition to the TCP protocol, a communication protocol having a flow control can be employed. Namely, in a case that the communication is performed by using the protocol having a flow control and the apparatus 10 is set at one side of the delay section in the network, when the computer 2 at the opposite side of the delay section receives data, the communication speed is improved, then a high speed communication is performed.

As mentioned above, in the case that the transmission delay occurs between the computers which communicate by using the satellite communication line or the long-distance communication, even if a sufficient band width is kept, a high speed communication is impossible because the maximum window size used by the flow control is limited in such a communication protocol that prevents an over-flow by limiting receiving data. However, in the present invention, the high speed apparatus 10 is set the transmission line between the computers 1 and 2, gets the packet flowing on the line, processes the packet and sends out the packet. Therefore, the ACK packet, of which response is originally delayed by the transmission delay, arrives at the other party faster than prior art, and then the other party can imagine that the communication is executed via the communication line without transmission delay. As the result, even if the window size used by the flow control is small, it is possible to perform high speed communication on the network having a large delay.

According to the apparatus for high speed communication on asymmetric line of the present invention, even if the communication is executed by the protocol of which flow control can not use a large window size, it is possible to perform high speed communication in one way via the network having a large delay, without changing any parameter in the protocol of the computer used for the communication and without adding any specific equipment or software to the computer.

We claim:

1. An apparatus for high speed communication on an asymmetric line, wherein said apparatus is set at a position on a communication line between first and second computers which respectively communicates by a communication protocol having a flow control and a transmission delay between said position and said first computer which is less than a transmission delay between said position and said second computer, further wherein said apparatus sends and receives a packet to/from said first and second computers, said apparatus comprising;

means for generating, instead of said second computer, an ACK packet in response to a data packet sent from said first computer, means for managing information regarding a connection between said first and second computers and a SYN packet and a SYN+ACK packet by obtaining and recording said information, means for storing a FIN packet, buffer means for storing said data packet sent from said first computer, means for transferring to said second computer a data packet which is sent from said first computer and of which the data amount is larger than an amount which notified by said second computer as a maximum amount of TCP window size by which said second computer can receive, for transferring to said first computer a data packet sent from said second computer, and for not transferring to said first computer an ACK packet sent from said second computer, wherein a high speed communication from said first computer to said secon computer is performed.

2. The apparatus claimed in claim 1, said communication protocol being the TCP protocol.

3. The apparatus of claim 1, wherein said information management means deletes said recorded information after disconnecting said connection.

4. The apparatus claimed in claim 1, wherein said FIN packet storing means transfers said stored FIN packet after a termination of data transfer.

5. The apparatus claimed in claim 1, 2, 3, or 4, said first computer being connected with the Internet, a satellite communication line being included in a line from said first computer to said second computer, and a transmission delay of a line from said second computer to said first computer being less than a transmission delay of said satellite communication line.

* * * * *